June 17, 1969  M. GARFINKEL  3,451,030
SOLDER-BONDED SEMICONDUCTOR STRAIN GAUGES
Filed July 1, 1966
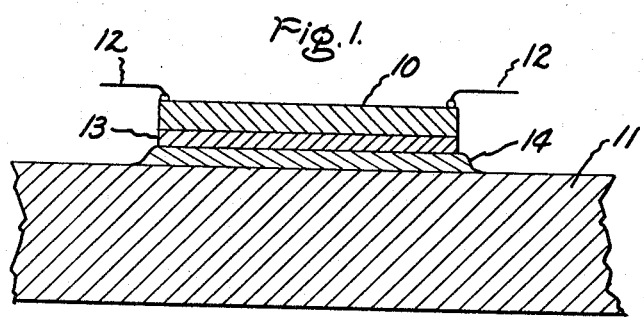
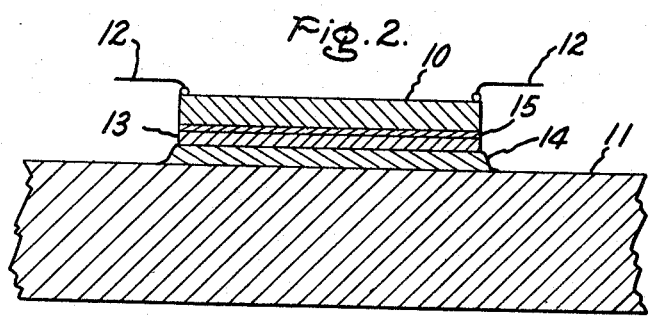
Inventor:
Marvin Garfinkel,
by Marvin Snyder
His Attorney.

United States Patent Office 3,451,030
Patented June 17, 1969

3,451,030
SOLDER-BONDED SEMICONDUCTOR STRAIN
GAUGES
Marvin Garfinkel, Schenectady, N.Y., assignor to General
Electric Company, a corporation of New York
Filed July 1, 1966, Ser. No. 562,155
Int. Cl. H01c 15/04, 17/00; G01l 1/22
U.S. Cl. 338—2                                    10 Claims

ABSTRACT OF THE DISCLOSURE

Apparatus for measuring strain in a member of material having a yield point at least equal to that of the gauge comprises a strain responsive semiconductor element, a thin solderable film in bonded contact with the element, and a layer of solder joining the element to the member. Fabrication of the apparatus includes depositing a layer of solderable material onto the surface of the semiconductor and firing the semiconductor in a reducing atmosphere at a temperature below the alloying temperature of the semiconductor in order to secure a tenacious bond to the semiconductor.

---

This invention relates to semiconductor strain gauges, and more particularly to bonding of semiconductor strain gauges to solderable members.

Semiconductor strain gauges provide many advantages over conventional metal film strain gauges. For example, semiconductor strain gauges provide strain measurements of greater sensitivity, are more rugged, have substantially no tendency to creep, and are insensitive to moisture. However, semiconductor strain gauges are also considerably stiffer than metal film gauges. In the past, this characteristic was considered a disadvantage, since it made the problem of securely bonding the semiconductor gauge to the object in which strain is to be measured, quite acute.

Ideally, the semiconductor strain gauge should be alloyed directly to the strained object so as to provide a rigid attachment thereto. This would avoid erroneous diminution of strain measurements caused by presence of intervening material between the object and the gauge. This is seldom feasible, however, due to damage to the gauge and weakening of the strained member which would result from the high temperatures required for alloying. Moreover, it is often impossible, due to the size, physical placement, etc., of the strained member, to heat the member to alloying temperatures. The present invention concerns a method and apparatus for overcoming this problem by providing a semiconductor strain gauge which may be soldered to a metallic or other type of solderable member by use of conventional solder. Temperatures involved in the soldering operation are well below the level at which damage to the gauge occurs. Moreover, since the solder manifests no tendency to creep, in comparison with organic adhesives which are often used for bonding, the gauge accurately follows strains in the strained member. Hence, it may be said that the solder furnishes a rigid elastic bond to the strained member.

Accordingly, one object of this invention is to provide a semiconductor strain gauge capable of being solder-bonded to a member in which strain is to be measured.

Another object is to provide a rugged semiconductor strain gauge having a rigid elastic bond to a member in which strain is to be measured.

Another object is to provide a semiconductor strain gauge capable of producing accurate strain measurements over long periods of time.

Another object is to provide a semiconductor strain gauge which may easily be securely attached to a solderable member.

Another object is to provide a method of tenaciously bonding a semiconductor strain gauge to a strained member through an intermediate layer of solderable metal.

Another object is to provide a method of tenaciously bonding metal to a semiconductor strain gauge by low temperature heat treatment.

Briefly, in a preferred embodiment of the invention, a thin film of metal is applied to the back or mounting side of a semiconductor strain gauge, and the combination thus produced is fired in a reducing atmosphere, such as hydrogen, at a temperature below the alloying temperature of the semiconductor. A typical strain gauge which may be used in accordance with the invention is disclosed and claimed in G. E. Fenner patent application, Ser. No. 104,271, filed Apr. 30, 1961, now Patent 3,251,222 issued May 17, 1966, and assigned to the instant assignee. Properties of the metal to be used for the film include capability of tenaciously adhering to the semiconductor and yet being insoluble in the solidified semiconductor. Moreover, the metal must have low solubility in components of the usual solders using lead and tin. When the strain gauge is subsequently soldered to a material having a yield point greater than that of the gauge, the great strength of the bond is manifest from the fact that stressing the semiconductor through the bond to a sufficient degree causes structural failure of the semiconductor itself, rather than the bond.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIGURE 1 is a cross-sectional view of a semiconductor strain gauge bonded through a layer of solderable material to a strained member; and FIGURE 2 is a cross-sectional view of a semiconductor strain gauge bonded through a layer of nickel and an intermediate metallic layer to a metallic member.

In FIGURE 1, a strain gauge 10, comprised of a semiconductor such as silicon, is shown with a pair of attached leads 12, bonded to a strained member 11. Member 11 may comprise copper, iron, or steel, for example. The back of gauge 10 is in intimate contact with a layer 13 comprised of nickel, for example, which is attached to substrate 11 by means of a solder layer 14. Gauge 10 is so securely attached to member 11 that when the gauge is stressed to a sufficient degree through the bond, and the yield point of member 11 is at least equal to that of the gauge, structural failure occurs to the gauge rather than the bond.

The general procedure by which a silicon strain gauge may be so tenaciously bonded to a strained member first requires solution depositing or plating the back or mounting side of the strain gauge with nickel, either by electroless plating or electroplating. At this juncture, the nickel adheres quite strongly to the semiconductor device; however, the degree of adhesion is insufficient for purposes of soldering the gauge to a member to be strained since, when the member is strained, the gauge will become separated from the nickel backing.

To obviate this possibility, the gauge is next heat treated in a reducing atmosphere. For nickel deposited by electroless plating, the temperature of heat treatment is 575° C., which is well below the temperature at which alloying takes place. Although the mechanism by which nickel is made so tenaciously adherent to silicon by this heat treating process is not entirely understood, it is apparent that bonding of these materials is greatly enhanced by this heat treatment. The tenacity of the bond which may then be made between the gauge and a solderable member by use of a soft solder is such that, as previously mentioned, when the silicon is sufficiently strained through its bond, it is the silicon which fails structurally, not the bond.

ricating the nickel backing for the silicon strain gauge, the following combinations of intermediate layers of metal with electroplated nickel have been used.

In the embodiment of FIGURE 2, wherein like numerals indicate like elements, an intermediate metallic

| Silicon gauge sample | First intermediate layer and thickness | Second intermediate layer and thickness | Nickel layer thickness | Firing temperature (° C.) in reducing atmosphere | When to discontinue firing |
|---|---|---|---|---|---|
| 1 | Gold, 1 micron | Copper, 1 micron | 3 micron | 650-700 | Slight color change observed. |
| 2 | do | None | do | 650 | Do. |
| 3 | Silver, 1 micron | do | do | 770-800 | 5-10 seconds. |
| 4 | Indium, 1 micron | do | do | 850-900 | Plated layers melt. |

Specifically, the strain gauge bond may be fabricated by electroless deposition of a 3 micron thickness of nickel onto the back of a silicon strain gauge, such as that described in the aforementioned Fenner application, Ser. No. 104,271, from an electroless nickel plating solution such as that commercially produced under the trade name "Enplate Ni-410" by Enthone Incorporated, New Haven, Conn., or from any other commercially available electroless nickel plating solution. Subsequently, the nickel plated silicon strain gauge is heated for from 5-10 seconds in a hydrogen atmosphere at 575° C. The heat is then discontinued, and the device may thereafter be soldered to a solderable member with any common soft solder.

The strain gauge bond may also be fabricated by electrolytic deposition of a 2-5 micron thickness of nickel onto the aforementioned silicon strain gauge from a conventional electrolytic nickel plating solution. The nickel layer is plated at the recommended temperature for the specific bath, such as 45° C. for a bath comprising nickel sulfamate, at a rate of 1 micron of thickness per minute. When the desired thickness of nickel has been achieved, the device is removed from the electrolytic plating bath and fired in a hydrogen atmosphere at 750-800° C. until a color change is noted. The heat is then discontinued and the device may thereafter be soldered to a solderable member with any of the conventional soft solders.

Comparison of the two preceding methods of fabrication reveals that the electrolessly deposited nickel film may be fired at a considerably lower temperature than the electrolytically deposited film, and for about the same duration. Although the reason for this phenomenon is not entirely understood, it is quite possible that phosphorous present in the electroless nickel plating solution serves to facilitate the process by which the nickel is tenaciously bonded to the silicon.

As alternatives to the aforementioned methods of fablayer 15 is shown between nickel layer 13 and silicon gauge 10. Layer 15 may comprise any of the intermediate layer metals in samples 2-4 of the above table. Alternatively, layer 15 may comprise the pair of gold and copper layers of sample 1 of the table, with the gold sandwiched between the silicon and the copper. The intermediate layer or layers are first plated onto the strain gauge, followed by the nickel layer. The same tenacious adherence by the strain gauge to the strained member is observed as with the structure of FIGURE 1, following the heat treatment as specified in Table I and bonding to solderable member 11 with a conventional soft solder 14.

For the platings performed in accordance with Table I, commercial electroplating solutions were utilized, under the following conditions:

TABLE II

| Plated layer | Electrolytic bath temperature | Plating rate |
|---|---|---|
| Nickel | 45° C | 1 micron/minute. |
| Copper | Room temperature | ½ micron/minute. |
| Gold | do | 1 micron/minute. |
| Silver | do | Do. |
| Indium | do | Do. |

Other types of semiconductor strain gauges may also be solder-bonded to a strained member in similar fashion. For example, strain gauge 10, as illustrated in FIGURE 1, though comprised of cadmium telluride, gallium arsenide or germanium, may be tenaciously bonded to solderable strained member 11 through a solderable layer 13, by a process similar to those already described. Thus, a cadmium telluride strain gauge may be bonded to a solderable strained member in accordance with the following table:

TABLE III

| Cd Te gauge sample | Solderable layer and thickness | How solderable layer is applied | Firing temperature in reducing atmosphere |
|---|---|---|---|
| 1 | Cu, 1 micron | Evaporated | 450° C. for 5-10 seconds. |
| 2 | Cu, 2½ microns | Electroplate from any standard, commercial CuSO₄ bath at ½ micron/minute, at room temperature. | 475° C. for about 5 minutes. |
| 3 | Ni, 4 microns | Electroless plating from Enplate Ni-410 bath. | 420° C. for 5-10 seconds. |
| 4 | Ni, 4 microns | Electroplate from any standard commercial nickel sulfamate bath at 1 micron/minute, at 45° C. | 475° C. for 5-10 seconds. |
| 5 | Sn, 1 micron | Electroplate from any standard, commercial SnSO₄ bath at 1 micron/minute, at room temperature. | 410° C. for 5-10 seconds. |

In addition, a gallium arsenide strain gauge may be tenaciously bonded to a solderable strained member by similar processes, in accordance with the following table:

TABLE IV

| Ga As gauge sample | Solderable layer and thickness | How solderable layer is applied | Firing temperature in reducing atmosphere |
|---|---|---|---|
| 1 | Cu, 1-2 microns | Evaporate, or electroplate from standard commercial alkaline Cu bath at ½ micron/minute at room temperature. | 450-550° C. for 5-10 seconds. |
| 2 | Ni, 1-2 microns | Electroless plating from Enplate Ni-410 bath. | About 750° C. for 5-10 seconds. |

A germanium strain gauge likewise may be tenaciously bonded to a solderable strained member by electrolessly or electrolytically plating a 1–2 micron thickness of copper onto the gauge and firing the gauge in a reducing atmosphere at 450–540° C. for 5–10 seconds.

The foregoing describes a method of tenaciously adhering a layer of solderable material to a semiconductor strain gauge so as to facilitate solder-bonding of the strain gauge to a member in which strain is to be measured. This results in a strong, rigid, elastic bond between the strain gauge and the member, enabling the gauge to produce accurate strain measurements over long periods of time. Moreover, if any of the aforementioned semiconductor strain gauges is soldered to a material having a yield point greater than that of the gauge and is subsequently stressed through its bond to a sufficient degree, structural failure occurs to the semiconductor, rather than the bond.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What is claimed is:

1. In strain gauge apparatus for measuring strain in a member of material having a yield point at least equal to that of the gauge, the combination comprising a semiconductor element responsive to strain in said member, a thin solderable film coated on said semiconductor element and intimately bonded thereto by firing in a reducing atmosphere at a temperature below the alloying temperature of said semiconductor, and a layer of solder joining said element to said member.

2. The combination of claim 1 wherein said solderable film comprises nickel.

3. The combination of claim 2 wherein said semiconductor element comprises silicon.

4. The combination of claim 3 wherein said nickel film is bonded to said strain responsive element through a metallic layer, said metallic layer comprising one of the group consisting of gold, silver and indium.

5. The combination of claim 3 wherein said nickel film is bonded to said strain responsive element through a pair of metallic layers, said metallic layers comprising a layer of gold bonded to said element and a layer of copper bonded to said gold.

6. The combination of claim 2 wherein said semiconductor element comprises cadmium telluride.

7. The combination of claim 2 wherein said semiconductor element comprises gallium arsenide.

8. The combination of claim 1 wherein said solderable film comprises copper.

9. The combination of claim 8 wherein said semiconductor element comprises one of the group consisting of cadmium telluride, gallium arsenide and germanium.

10. The combination of claim 1 wherein said semiconductor element comprises cadmium telluride and said solderable film comprises tin.

References Cited
UNITED STATES PATENTS

| | | | |
|---|---|---|---|
| 2,914,449 | 11/1959 | Mayer | 204—37 X |
| 2,793,420 | 5/1957 | Johnston et al. | 29—590 |
| 3,254,529 | 6/1966 | Thurston | 73—885. |
| 3,315,200 | 4/1967 | Hannay | 338—2 |
| 3,364,064 | 1/1968 | Wijburg | 204—37 X |
| 3,160,844 | 12/1964 | McLellan | 338—4 |
| 3,251,222 | 5/1966 | Fenner | 73—88.5 |
| 2,990,529 | 6/1961 | Courtney-Pratt | 338—3 X |

REUBEN EPSTEIN, Primary Examiner.

U.S. Cl. X.R.

29—610